United States Patent [19]
Favrot et al.

[11] Patent Number: 5,714,422
[45] Date of Patent: Feb. 3, 1998

[54] TRANSPARENT GLASS

[76] Inventors: Guy A. Favrot, Hüttikerstrasse 51, 8955 Oetwill An Der Limmat, Switzerland; Albert Truyol, Avenue du CLos Toutain 47, 92420 Vaucresson, France

[21] Appl. No.: 619,944

[22] Filed: Mar. 18, 1996

Related U.S. Application Data

[63] Continuation-in-part of Ser. No. 522,499, Aug. 31, 1995, abandoned.

[30] Foreign Application Priority Data

Sep. 16, 1994 [FR] France ................... 94 11055

[51] Int. Cl.⁶ .................................................. C03C 3/095
[52] U.S. Cl. .................... 501/64; 501/56; 501/67; 501/70
[58] Field of Search ........................ 501/64, 67, 70, 501/56

[56] References Cited

U.S. PATENT DOCUMENTS

| | | | |
|---|---|---|---|
| 3,790,260 | 2/1974 | Boyd et al. ............... | 501/69 |
| 3,997,250 | 12/1976 | Krohn et al. ............. | 501/64 |
| 4,012,131 | 3/1977 | Krohn et al. ............. | 501/69 |
| 4,042,405 | 8/1977 | Krohn et al. ............. | 501/70 |
| 4,562,161 | 12/1985 | Mennemann et al. ..... | 501/59 |
| 4,565,791 | 1/1986 | Boudot et al. ............ | 501/56 |
| 4,719,186 | 1/1988 | Mennemann et al. ..... | 501/59 |
| 4,746,634 | 5/1988 | Danielson ................. | 501/67 |
| 5,219,801 | 6/1993 | Shorrock et al. .......... | 501/65 |
| 5,525,553 | 6/1996 | Brocheton et al. ........ | 501/64 |

FOREIGN PATENT DOCUMENTS

| | | |
|---|---|---|
| 0505061 | 9/1992 | European Pat. Off. . |
| 2115403 | 9/1983 | United Kingdom . |

OTHER PUBLICATIONS

Abstracts of Japanese Patents Nos.: JP3040938 dated Feb. 21, 1991; JP4254435 dated Sep. 9, 1992; and JP6056467 dated Mar. 1, 1994.

*Primary Examiner*—Mark L. Bell
*Assistant Examiner*—Louis M. Troilo
*Attorney, Agent, or Firm*—Kane, Dalsimer, Sullivan, Kurucz, Levy, Eisele and Richard, LLP

[57] ABSTRACT

Transparent glass obtained from a mixture of oxides, wherein the mixture of oxides has the following composition, expressed as a percentage of the total weight:

| | | | |
|---|---|---|---|
| $SiO_2$ | 59 | to | 78 |
| $B_2O_3$ | 2 | to | 8 |
| $Na_2O$ | 3 | to | 8 |
| $K_2O$ | 0.2 | to | 1.5 |
| $Li_2O$ | 0.5 | to | 2.5 |
| $CaO$ | 3 | to | 12 |
| $MgO$ | 1 | to | 8 |
| $ZnO$ | 0.2 | to | 3 |
| $Al_2O_3$ | 1.5 | to | 4 |
| $TiO_2$ | 0.1 | to | 0.8 |
| $ZrO_2$ | 0.7 | to | 2.5 |
| $Fe_2O_3$ | 0.01 | to | 0.3 |
| $SO_3$ | 0.01 | to | 0.3 |
| $CeO_2$ | 0.1 | to | 0.2 |

This glass is particularly strong.

4 Claims, No Drawings

TRANSPARENT GLASS

The present patent application is a continuation-in-part of the patent application Ser. No. 522,499 filed Aug. 31, 1995 and now abandoned.

FIELD OF THE INVENTION

The subject of the present invention is a novel transparent glass obtained from a mixture of oxides.

PRIOR ART

A high-quality transparent glass, that is to say one having a good strength, consists of silica and a certain number of oxides. Such a glass may, for example, have the following composition, the figures representing values as a percentage of the total weight:

| | |
|---|---|
| $SiO_2$ | 71 |
| $B_2O_3$ | 0.3 |
| $Na_2O$ | 13.5 |
| $K_2O$ | 0.3 |
| $Li_2O$ | 0.1 |
| CaO | 9.5 |
| MgO | 0.9 |
| BaO | 1.1 |
| ZnO | 0.3 |
| $Al_2O_3$ | 2.3 |
| $TiO_2$ | 0.03 |
| $Fe_2O_3$ | 0.02 |
| $SO_3$ | 0.15 |
| $CeO_2$ | 0.10 |

SUMMARY OF THE INVENTION

The object of the invention is to increase the tensile strength of the glass.

For this purpose it was initially thought to increase the proportion of titanium oxide. However, according to those skilled in the art, that is to say glass-makers, an increase in the proportion of titanium oxide, of for example from 0.03% to 0.8%, would necessarily make the glass "stand out", that is to say it would become translucent or opaque or at the very least exhibit blemishes. However, contrary to this preconception, it turns out that the proportion of titanium oxide can be increased to a much greater extent without the glass standing out.

In addition, the proportion of magnesium oxide has been increased considerably and zirconium oxide has been added in a proportion of approximately 1%, an oxide which has not been used hitherto. As a result of these measures, it has been possible to obtain a perfectly transparent glass, the tensile strength of which is approximately 1.5 times greater than that of known glasses.

The glass according to the invention is obtained from a mixture of oxides having the following composition, expressed as a percentage of the total weight:

| | | | |
|---|---|---|---|
| $SiO_2$ | 59 | to | 78 |
| $B_2O_3$ | 2 | to | 8 |
| $Na_2O$ | 3 | to | 8 |
| $K_2O$ | 0.2 | to | 1.5 |
| $Li_2O$ | 0.5 | to | 2.5 |
| CaO | 3 | to | 12 |
| MgO | 1 | to | 8 |
| ZnO | 0.2 | to | 3 |
| $Al_2O_3$ | 1.5 | to | 4 |
| $TiO_2$ | 0.1 | to | 0.8 |
| $ZrO_2$ | 0.7 | to | 2.5 |
| $Fe_2O_3$ | 0.01 | to | 0.3 |
| $SO_3$ | 0.01 | to | 0.3 |
| $CeO_2$ | 0.1 | to | 0.2 |

$SO_3$ may be replaced by $NO_3$ or $PO_3$ or $Cl_2$.

These compositions have proved that they avoid "demixing" of the glass.

EXAMPLE

A glass has been produced from the following composition, again expressed as a percentage of the total weight:

| | |
|---|---|
| $SiO_2$ | 70.30 |
| $B_2O_3$ | 5.00 |
| $Na_2O$ | 6.10 |
| $K_2O$ | 0.4 |
| $Li_2O$ | 2.1 |
| CaO | 8.7 |
| MgO | 3.3 |
| ZnO | 1.1 |
| $Al_2O_3$ | 3.4 |
| $TiO_2$ | 0.4 |
| $ZrO_2$ | 1.1 |
| $Fe_2O_3$ | 0.01 |
| $SO_3$ | 0.20 |
| $CeO_2$ | 0.1 |

It will be noted that barium oxide is absent, this being present in a proportion of 1.1% in the glassmaker's base glass.

A series of fracture measurements were carried out according to the ISO 5014 method using 120×20×10 mm test pieces. With regard to the tensile strength, the measurements gave an average value of 79.0 MPa. The same measurements performed on a glass obtained using the preparation methods of the prior art, defined in the introduction, gave an average value of 51.3 MPa. The increase in tensile strength is therefore of the order of 54%.

The measurements were made at the test laboratory of the Société Francaise de Céramique [French Ceramics Company]. The strengths of the various glasses tested were determined in three-point bending on a 10 kN press with an accuracy of the order of 0.1N and with a rate of loading of 150 MPa/min.

This increase in strength makes it possible either to produce stronger glass, especially window glass, or to produce thinner glass having the same strength as current glasses, which would allow, for example, thinner and consequently lighter bottles to be produced. Such a reduction in weight constitutes not only a material saving in manufacture but especially a weight saving during handling and transportation, which results in a major energy saving. This saving will be felt in all glass packaging for which an increase in strength is not necessary, for example in perfumery.

$SO_3$ may be replaced by $NO_3$, or $PO_3$, or $Cl_2$ in as far as their physico-chemical stability is suitable.

We claim:

1. A transparent glass obtained from a mixture of oxides, wherein the mixture of oxides has the following composition, expressed as a percentage of the total weight:

| | | | |
|---|---|---|---|
| SiO$_2$ | 59 | to | 78 |
| B$_2$O$_3$ | 2 | to | 8 |
| Na$_2$O | 3 | to | 8 |
| K$_2$O | 0.2 | to | 1.5 |
| Li$_2$O | 0.5 | to | 2.5 |
| CaO | 3 | to | 12 |
| MgO | 1 | to | 8 |
| ZnO | 0.2 | to | 3 |
| Al$_2$O$_3$ | 1.5 | to | 4 |
| TiO$_2$ | 0.1 | to | 0.8 |
| ZrO$_2$ | 0.7 | to | 2.5 |
| Fe$_2$O$_3$ | 0.01 | to | 0.3 |
| SO$_3$ | 0.01 | to | 0.3 |

-continued

| | | | |
|---|---|---|---|
| CeO$_2$ | 0.1 | to | 0.2. |

2. A transparent glass as claimed in claim 1, wherein SO$_3$ is replaced by NO$_3$.

3. A transparent glass as claimed in claim 1, wherein SO$_3$ is replaced by PO$_3$.

4. A transparent glass as claimed in claim 1, wherein SO$_3$ is replaced by Cl$_2$.

* * * * *